US008358383B2

(12) United States Patent
Wills

(10) Patent No.: US 8,358,383 B2
(45) Date of Patent: Jan. 22, 2013

(54) DYNAMIC TELEVISION MENU CREATION

(76) Inventor: Christopher R. Wills, Cambridge, MD (US)

( * ) Notice: Subject to any disclaimer, the term of this patent is extended or adjusted under 35 U.S.C. 154(b) by 458 days.

(21) Appl. No.: 12/634,173

(22) Filed: Dec. 9, 2009

(65) Prior Publication Data

US 2011/0134322 A1 Jun. 9, 2011

(51) Int. Cl.
*H04N 5/44* (2011.01)
(52) U.S. Cl. .................................................. 348/734
(58) Field of Classification Search ............... 348/734, 348/731, 461, 732, 563–566, 569, 553; 725/53, 725/37, 38
See application file for complete search history.

(56) References Cited

U.S. PATENT DOCUMENTS

| | | | |
|---|---|---|---|
| 5,585,865 A * | 12/1996 | Amano et al. .................. 725/14 |
| 5,982,411 A | 11/1999 | Eyer et al. |
| 6,072,535 A | 6/2000 | Kearns |
| 6,430,358 B1 | 8/2002 | Yuen et al. |
| 6,438,752 B1 | 8/2002 | McClard |
| 6,445,306 B1 | 9/2002 | Trovato et al. |
| 6,678,891 B1 * | 1/2004 | Wilcox et al. .................. 725/42 |
| 7,174,512 B2 * | 2/2007 | Martin et al. .................. 715/719 |
| 7,188,355 B1 | 3/2007 | Prokopenko et al. |
| 2002/0059610 A1 | 5/2002 | Ellis |
| 2003/0028885 A1 * | 2/2003 | Wilcox et al. .................. 725/60 |
| 2003/0046700 A1 * | 3/2003 | Wilcox et al. .................. 725/60 |
| 2003/0095156 A1 | 5/2003 | Klein et al. |
| 2006/0259864 A1 | 11/2006 | Klein et al. |
| 2006/0259934 A1 | 11/2006 | Fries |
| 2007/0192800 A1 * | 8/2007 | Walter et al. .................. 725/53 |
| 2007/0250864 A1 | 10/2007 | Diaz Perez |
| 2008/0163307 A1 | 7/2008 | Coburn et al. |
| 2008/0178216 A1 | 7/2008 | Bennington et al. |
| 2008/0178224 A1 | 7/2008 | Laude et al. |
| 2008/0229351 A1 | 9/2008 | Torimaru |
| 2008/0278634 A1 * | 11/2008 | Huang et al. .................. 348/734 |
| 2008/0301737 A1 | 12/2008 | Hjelmeland Almas et al. |

* cited by examiner

*Primary Examiner* — Paulos M Natnael
(74) *Attorney, Agent, or Firm* — Crowell & Moring LLP

(57) ABSTRACT

Output useable to select a desired communication channel from among multiple communication channels in a plurality of channel categories is provided by way of a remote control device. A user accomplishes this by selecting, in place of a displayed icon that is to be "unselected," another icon, representing the desired communication channel, within a selected category of icons displayed by the remote control device representing channels in a selected channel category. Upon selection of such an icon, icons within the selected category of icons and icon categories are both dynamically reconfigured, based on how recently the icons were selected, so as to minimize inputs necessary to alternate from the selected icon back to the unselected icon. A signal output from the remote control device is receivable by a communication device in order to effect a change over to the desired communication channel.

10 Claims, 12 Drawing Sheets

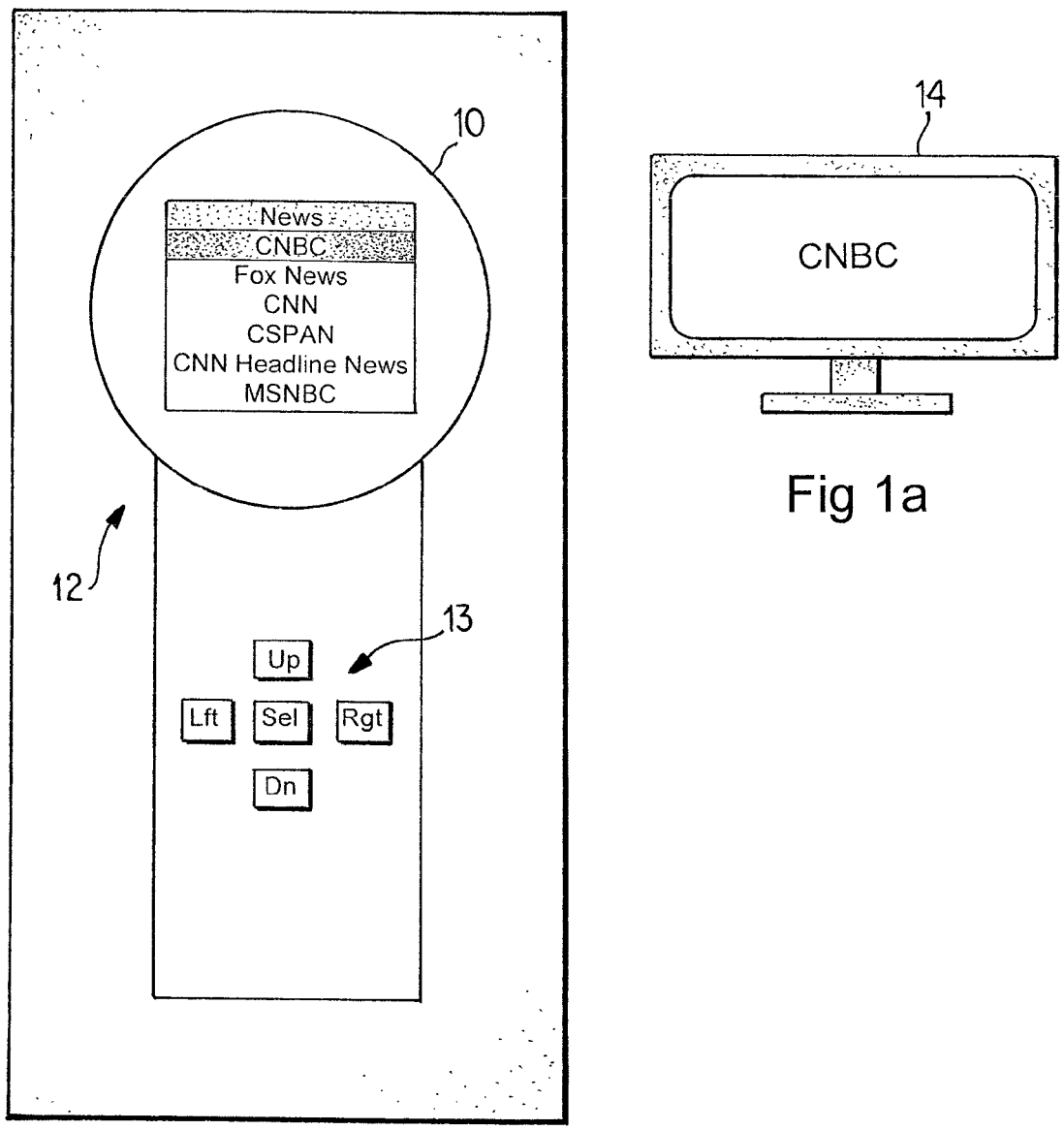

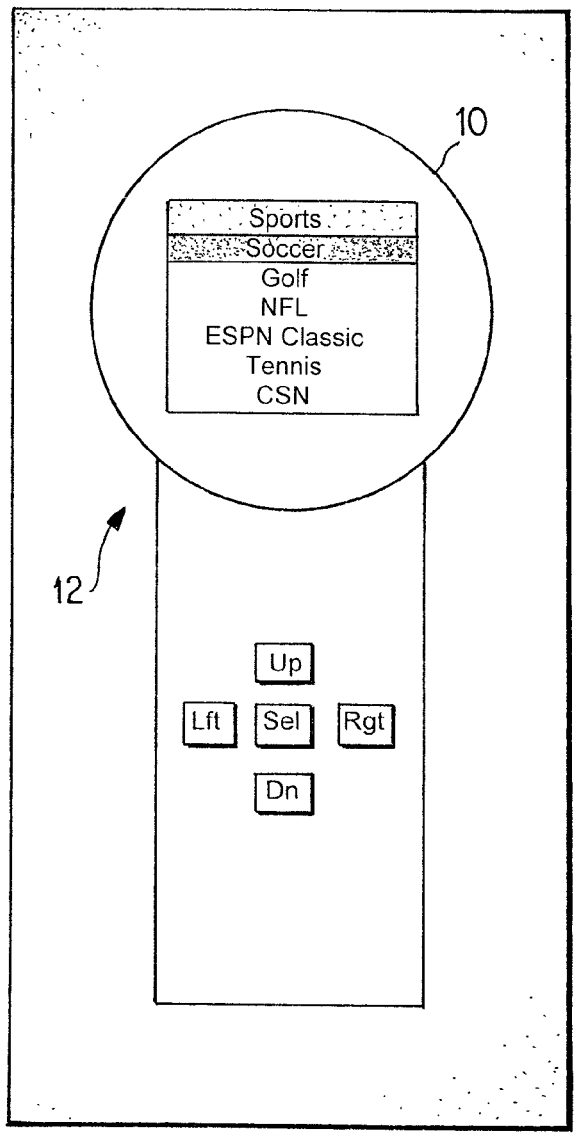
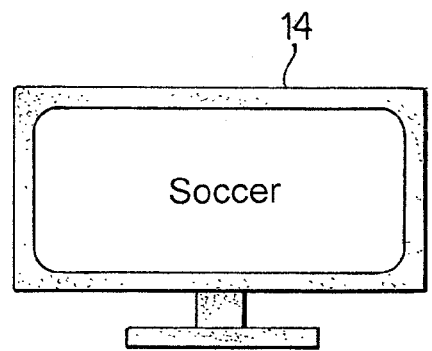
Fig. 6a
Fig. 6

| Sports | News | Entertainment | Kids | Movies | Music | Home/Garden | Science/History |
|---|---|---|---|---|---|---|---|
| Golf | CNBC | Comedy Central | Disney | Lifetime | Pop | Food Network | Science Channel |
| NFL | Fox News | Style | Cartoon Network | Stars | Top 40 | TLC | History Channel |
| ESPN Classic | CNN | Travel | Animal Planet | Encore | Country | HGTV | Discovery |
| Tennis | CSPAN | VH1 | TV Land | Showtime | Classical | Home 1 | Military Channel |
| Soccer | CNN Headline News | MTV | Nikelodian | HBO | Rap | Home 2 | Military Channel |
| CSN | MSNBC | E | Family Channel | AMC | Hip Hop | Home 3 | National Geographic |
| ESPN | CSPAN2 | Country Music TV | Kids 1 | TCM | Blues | Home 4 | Science 1 |
| NBA | Public Television | Black Ent TV | Kids 2 | Movies 1 | Rock n Roll | Home 5 | Science 2 |
| CBS | News 1 | Entertainment 1 | Kids 3 | Movies 2 | 50's | Home 6 | Science 3 |
| FOX | News 2 | Entertainment 2 | Kids 4 | Movies 3 | 60's | Garden 1 | Science 4 |
| ESPN 2 | News 3 | Entertainment 3 | Kids 5 | Movies 4 | 70's | Garden 2 | History 1 |
| Speed | News 4 | Entertainment 4 | Kids 6 | Movies 5 | 80's | Garden 3 | History 2 |
| MASN | News 5 | Entertainment 5 | Kids 7 | Movies 6 | 90's | Garden 4 | History 3 |
| NBC | News 6 | Entertainment 6 | Kids 8 | Movies 7 | Jazz | Garden 5 | History 4 |

Fig. 7

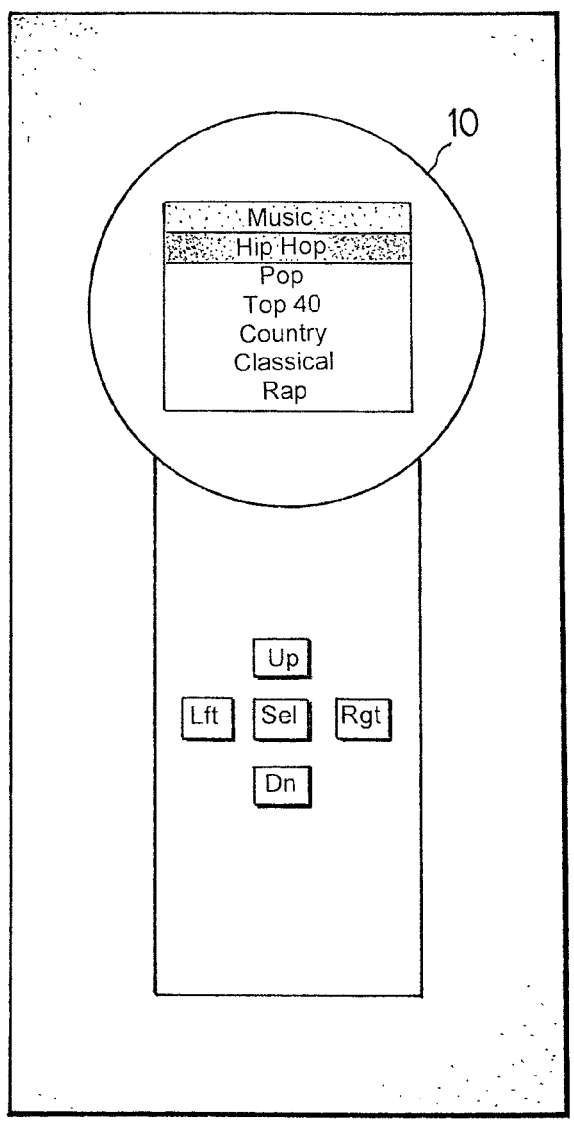
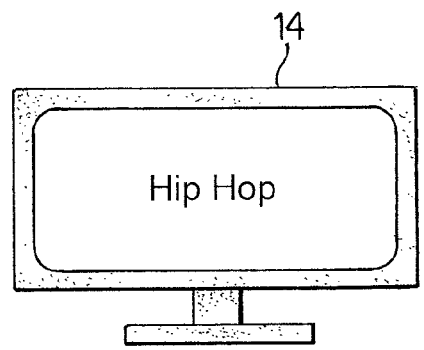
Fig. 8a
Fig. 8

| Sports | Music | News | Entertainment | Kids | Movies | Home/Garden | Science/History |
|---|---|---|---|---|---|---|---|
| Golf | Hip Hop | CNBC | Comedy Central | Disney | Lifetime | Food Network | Science Channel |
| NFL | Pop | Fox News | Style | Cartoon Network | Stars | TLC | History Channel |
| ESPN Classic | Top 40 | CNN | Travel | Animal Planet | Encore | HGTV | Discovery |
| Tennis | Country | CSPAN | VH1 | TV Land | Showtime | Home 1 | Military Channel |
| Soccer | Classical | CNN Headline News | MTV | Nikelodian | HBO | Home 2 | Military Channel |
| CSN | Rap | MSNBC | E | Family Channel | AMC | Home 3 | National Geographic |
| ESPN | Blues | CSPAN2 | Country Music TV | Kids 1 | TCM | Home 4 | Science 1 |
| NBA | Rock n Roll | Public Television | Black Ent TV | Kids 2 | Movies 1 | Home 5 | Science 2 |
| CBS | 50's | News 1 | Entertainment 1 | Kids 3 | Movies 2 | Home 6 | Science 3 |
| FOX | 60's | News 2 | Entertainment 2 | Kids 4 | Movies 3 | Garden 1 | Science 4 |
| ESPN 2 | 70's | News 3 | Entertainment 3 | Kids 5 | Movies 4 | Garden 2 | History 1 |
| Speed | 80's | News 4 | Entertainment 4 | Kids 6 | Movies 5 | Garden 3 | History 2 |
| MASN | 90's | News 5 | Entertainment 5 | Kids 7 | Movies 6 | Garden 4 | History 3 |
| NBC | Jazz | News 6 | Entertainment 6 | Kids 8 | Movies 7 | Garden 5 | History 4 |

Fig. 9

| Sports | News | Entertainment | Kids | Movies | Home/Garden | Science/History | Music |
|---|---|---|---|---|---|---|---|
| Golf | CNBC | Comedy Central | Disney | Lifetime | Food Network | Science Channel | Hip Hop |
| NFL | Fox News | Style | Cartoon Network | Stars | TLC | History Channel | Pop |
| ESPN Classic | CNN | Travel | Animal Planet | Encore | HGTV | Discovery | Top 40 |
| Tennis | CSPAN | VH1 | TV Land | Showtime | Home 1 | Military Channel | Country |
| Soccer | CNN Headline News | MTV | Nikelodian | HBO | Home 2 | Military Channel | Classical |
| CSN | MSNBC | E | Family Channel | AMC | Home 3 | National Geographic | Rap |
| ESPN | CSPAN2 | Country Music TV | Kids 1 | TCM | Home 4 | Science 1 | Blues |
| NBA | Public Television | Black Ent TV | Kids 2 | Movies 1 | Home 5 | Science 2 | Rock n Roll |
| CBS | News 1 | Entertainment 1 | Kids 3 | Movies 2 | Home 6 | Science 3 | 50's |
| FOX | News 2 | Entertainment 2 | Kids 4 | Movies 3 | Garden 1 | Science 4 | 60's |
| ESPN 2 | News 3 | Entertainment 3 | Kids 5 | Movies 4 | Garden 2 | History 1 | 70's |
| Speed | News 4 | Entertainment 4 | Kids 6 | Movies 5 | Garden 3 | History 2 | 80's |
| MASN | News 5 | Entertainment 5 | Kids 7 | Movies 6 | Garden 4 | History 3 | 90's |
| NBC | News 6 | Entertainment 6 | Kids 8 | Movies 7 | Garden 5 | History 4 | Jazz |

Fig. 10

DYNAMIC TELEVISION MENU CREATION

BACKGROUND OF THE INVENTION

1. Field of the Invention

A relatively simple solution to problems presented by the proliferation of cable and satellite television channels is provided by way of a remote control device allowing efficient management of a wide selection of channels.

2. Description of Related Art

Virtually all related art is sufficiently complex so as to make use thereof difficult and cumbersome to understand and operate for many if not most users. U.S. Pat. No. 6,438,752 to McClard, for example, concerns a method for selecting programs based on a user's past selection history. An input signal, indicating the identity of the user, and a first input signal from the identified user, representing a first selection preference, are received. Based on the first input signal, the channel that is currently assigned a program corresponding to the highest reception frequency for the first selection preference in the past reception history of the identified user for the current time period is determined. Automatic tuning to the channel determined to have the program corresponding to the highest reception frequency is then performed.

U.S. Pat. No. 7,188,355 to Prokopenko et al. relates to a learning module that records characteristics associated with each program viewed by a user, and forms sets of these characteristics. The frequency at which each set occurs is also determined. A recommendation module uses a number of tasks to compile a list of viewer recommendations. Various tasks are defined, with each task defining a unique combination of a manner of ordering the viewer profile, and particular relevance filters for filtering the ordered viewer profile. Upon entry of a user request for a list of program recommendations, a search of data for programs with characteristics that best match sets selected by the tasks is performed. The user is notified of the availability of such programs, allowing selection of a particular program.

U.S. Pat. No. 6,445,306 to Trovato et al. concerns a remote control program selection system in which a list builder creates a number of different lists, with each list containing an identification of programs that are likely to relate to a particular topic or genre. When the user selects the topic or genre, the appropriate list is accessed, and the user is provided with a way to incrementally select the programs contained in the selected list. In one particular arrangement, the list builder includes a number of capabilities for improving the selective quality of the lists, having access, for example, to an information source that provides the time of each scheduled program on each channel, and an indication of the topic or genre for each program. In a similar manner, creation of the lists or the selection of the appropriate list is enhanced and improved based upon expressed and implied preferences that are determined, for example, by the user's past selections, rejections, or selections and rejections.

Numerous other documents relating to universal remote control devices and dynamic channel ordering also exist. U.S. Patent Application Publications 2006/0259864 to Klein et al., 2003/0095156 to Klein et al., 2002/0059610 to Ellis, 2006/0259934 to Fries, 2007/0250864 to Diaz Perez, 2008/0163307 to Coburn et al., 2008/0178216 to Bennington et al., 2008/0178224 to Laude et al., 2008/0229351 to Torimaru, and 2008/0301737 to Hjelmeland Almas et al., U.S. Pat. No, 5,982,411 to Eyer et al., U.S. Pat. No. 6,072,535 to Kearns, and U.S. Pat No. 6,430,358 to Yuen et al., and German document 10 2008 011 630 to Torimaru (which corresponds to U.S. Patent Application Publication 2008/0229351 already mentioned) provide examples of this technology.

SUMMARY OF THE INVENTION

Many hundreds of television channels are available on most cable and satellite systems. Additional channels are also introduced all the time. Such a proliferation of channels makes it difficult and cumbersome for most viewers to efficiently manage the wide selection of channels. A relatively simple solution to this problem has not been developed or brought to the mass market.

The present invention is intended to provide a relatively simple solution to the channel management problem mentioned. Simplicity is a critical design element; the device should be easy to both set up and use. By way of this invention, relief from the need to use a typical television remote with 50 or more buttons is provided.

The device described is a very simple remote control device that allows a user to quickly change channels based upon an easily customized menu structure. The device can be characterized as an extension of the "last channel" feature found on most television remote control devices in use. Such a feature permits one to quickly toggle or jump back and forth between two channels.

A device according to this invention permits one to define a simple "favorites" channel directory. That directory has only two "levels." The first of these levels defines a channel "category," such as Sports, News, Movies, Home Improvement, Nature, History, and so on. The second "level" contains specific channels within any of the channel categories. As one example, the category "Sports" could contain ESPN, ESPN2, Comcast SportsNet, NFL Network, SPEED, and so on. Such a device makes "surfing" among a large number of television channels much quicker and easier. Since the device incorporates channel "recency" in a dynamic re-ordering process, the device groups or bunches favorite channels together so they are always just a few clicks away. The key principle at work is that the dynamic reordering of categories and channels based on recency keeps those channels viewed most recently the fewest clicks away.

The invention, in a preferred configuration, operates to provide output useable to select a desired communication channel from among multiple communication channels in a plurality of channel categories. A user accomplishes this by selecting, in place of an icon to be "unselected," another icon, representing the desired communication channel, within a selected category of icons displayed by the remote control device that represent channels in a selected channel category. Upon selection of such an icon, icons within the selected category of icons and icon categories are both dynamically reconfigured, based on how recently the icons were selected, so as to minimize inputs necessary to alternate from the selected icon back to the unselected icon. A signal output from the remote control device is receivable by a communication device in order to effect a change over to the desired communication channel.

Preferably, dynamically reconfiguring the icons within the selected icon category includes changing an order of icons within the selected icon category so that the selected icon is first in a displayed list of icons within the selected category and so that other icons within the selected category appear in the list based on how recently those other icons were selected. Dynamically reconfiguring the icon categories, moreover, preferably includes changing an order of icon categories so that an icon category including the selected icon and an icon category including the unselected icon are directly adjacent to one another.

An icon representing the desired communication channel may be chosen by displacing a cursor displayed by the remote control device in any of four directions and then actuating a button to select the icon. In one preferred arrangement, the remote control device includes separate buttons that are respectively actuated to displace the cursor in one of the four directions mentioned. In the disclosed embodiment, the icon categories are dynamically reconfigured into sequences that differ depending on how the cursor is displaced.

The remote control device may be set to receive manual input in order to generate the icons. An icon representing the desired communication channel can be chosen by displacing, through the use of separate buttons, a cursor displayed by the remote control device in any of four directions and then actuating a button to select the icon.

While the description provided relates specifically to a television remote control device, the invention is equally applicable to other devices, such as personal digital assistants (PDAs), cellular telephones, and smartphones, where switching back and forth between various functions can be managed more efficiently using dynamic re-ordering of selections based on recency in a menu structure similar to the one described for switching between channels on a television.

BRIEF DESCRIPTION OF THE DRAWINGS

FIG. 1 is a schematic illustration of a remote control device with a display exhibiting an at least partial list of icons stored in a conventional non-volatile memory forming a part of the remote control device.

FIG. 1a shows a television, monitor, or other visual display device as displaying a legend or other identifying information associated with a currently selected channel.

FIG. 6 is an illustration similar to FIG. 4, but in which an order of the listed icons is changed.

FIG. 6a shows the visual display device of FIG. 4a at another point in time during the channel changing procedure reflected in FIGS. 5 and 6.

FIG. 7 is an illustration of one possible overall menu of channel categories and icons representing channels within each channel category.

FIG. 8 is an illustration similar to FIG. 1, but in which another channel category is selected.

FIG. 8a is a view similar to that of FIG. 1a but relating to FIG. 8.

FIG. 9 is an illustration of a menu similar to that shown in FIG. 7, but in which the channel categories and icons have been reconfigured following a change in channel in a certain manner.

FIG. 10 is an illustration similar to that of FIG. 9, but in which the channel categories and icons have been reconfigured following the same change in channel but in a different manner.

DESCRIPTION OF THE PREFERRED EMBODIMENTS

Figures 2, 2A:
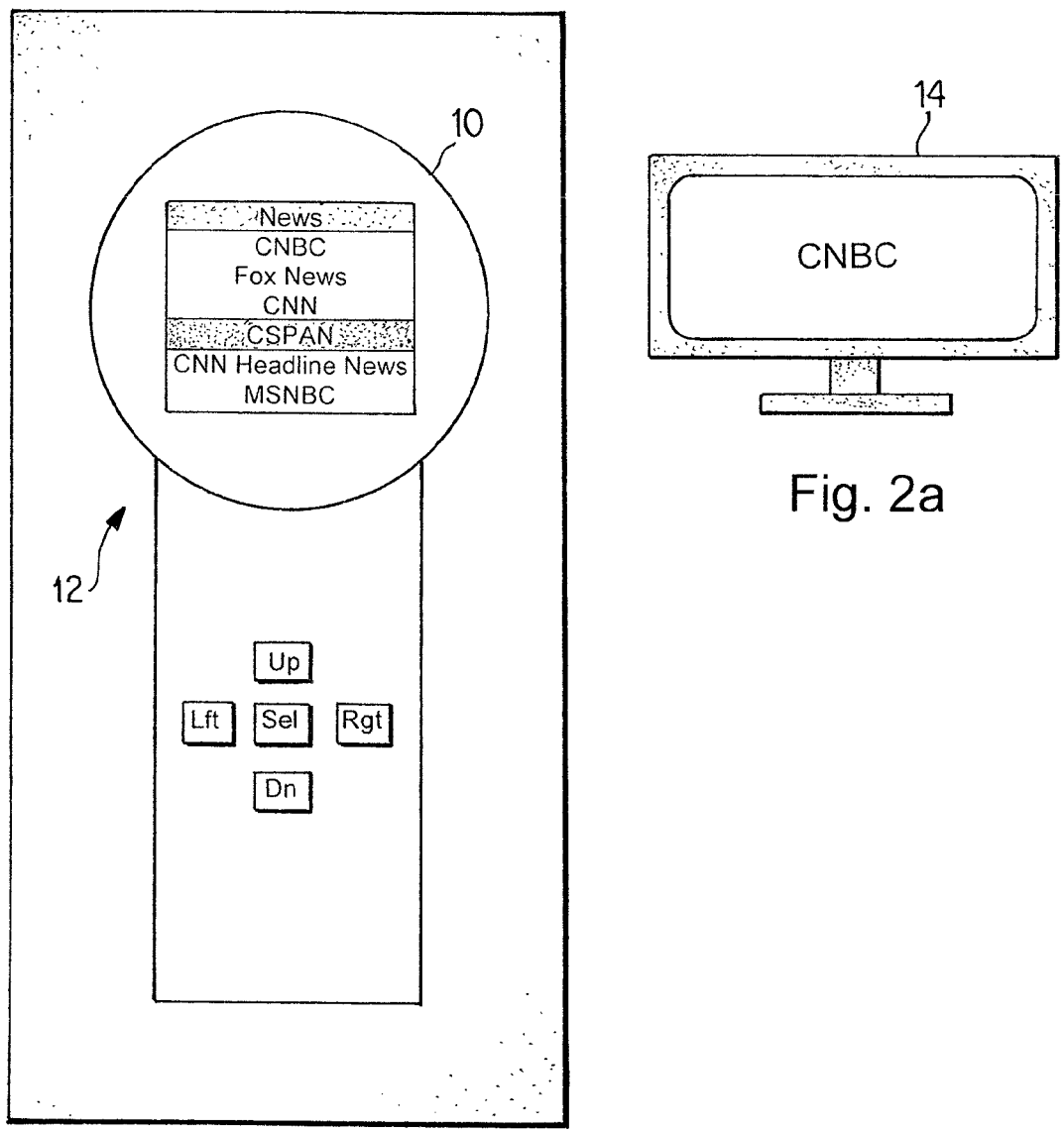
FIG. 2 is an illustration similar to FIG. 1, but in which the remote control device display exhibits a different cursor position during a channel changing procedure.
FIG. 2a shows the visual display device of FIG. 1a at one point in time during the channel changing procedure.

Prior to actual use of a remote control device according to the invention, a user can set up a menu containing his or her favorite channel categories, channels within particular channel categories, or both in a conventional fashion. Once that menu is created, just five buttons are needed for channel surfing. As will become clear when considering the following description while referring to the drawing figures, in a preferred embodiment, left and right buttons, which displace a cursor from its present position to the left and to the right, are used to switch among channel categories, and up and down buttons, which displace the cursor from its present position upwards and downwards, are used to switch among channels within a category. An easily accessible fifth button, used as a "select" button, can be located centrally with respect to the other four (left, right, up, and down) buttons. The select button is used to select a channel once an icon representing that channel is highlighted by pressing the left, right, up, and/or down buttons/button. Only a few additional buttons, such as on/off and volume buttons, are additionally needed for actual use of the remote control device. A mute button and/or an information button are/is also desirable.

One key feature of the invention is a "flashback" or "backtrack" (BAKTRACK) feature, by which the device dynamically adjusts both the order of the categories and icons representing the channels within each category so that icons representing the most recently viewed channels are the fewest "button clicks" or inputs away from the current channel. An icon representing the currently selected channel, or the last channel watched, in each category is registered as the first icon in the list of all icons for channels in that category. In a similar fashion, an icon representing the second most recently watched channel in a particular category is registered as the second icon in the list of all icons for channels in that category, an icon representing the third most recently watched channel in a particular category is registered as the third icon in the list of all icons for channels in that category, and so on. This re-ordering feature is intuitive and allows the user to switch quickly between the most recently watched channels.

FIG. 1 schematically illustrates a display 10 of a remote control device 12 according to the invention. The remote control device 12 is provided with an array 13 of cursor movement keys or buttons Lft, Rgt, Up, and Dn, and a select button Sel. The display 10 exhibits an at least partial list of icons stored in a conventional non-volatile memory forming a part of the remote control device 12. By way of example only, when a category identified as "News" has been selected by appropriate actuation of the left (Lft) button and/or the right (Rgt) button, channels such as C-SPAN, FOX News, CNN, CNN Headline News, CNBC, MSNBC, and so on within that category are made available for selection. After using the Lft button and/or the Rgt button to select the "News" category, the "select" cursor is located on the first, or topmost, icon representing the first channel in the "stack" or list. This first channel is the last channel watched in the "News" category; in the illustration provided by FIG. 1, the current channel (or the last-watched channel, if the remote control device has been powered off) is CNBC. To select another channel within the "News" category, a user operates the Up button and/or the down (Dn) button to move the cursor to the icon representing the desired channel. After moving the cursor to the icon representing the desired channel, the select (Sel) button is pressed, and the appropriate channel is made available. Icons in the icon directory representing channels in each category are ordered in a stack, so that an icon representing the previously selected channel in that category is now the second icon in the displayed list. Referring to FIG. 1, it is apparent that the "FOX News" channel was selected immediately prior to CNBC, which, again, is the current (or last-watched) channel in the "News" category. Similarly, the third icon in the list ("CNN" in FIG. 1) represents the channel watched immediately prior to the second channel (FOX News) in the list, and so on.

The remote control device 12 is configured so as to transmit signals causing a television, monitor, or other visual display device 14 to switch to the currently selected channel or function. As FIG. 1a shows, in the situation described immediately above, CNBC is identified by the display device 14 as the currently selected channel.

To switch from the current channel, CNBC, to C-SPAN, for example, a user presses the Dn button three times, moving the cursor away from the CNBC icon and past the "Fox News" and "CNN" icons, so that the cursor aligns with the C-SPAN icon as shown in FIG. 2. FIG. 2 shows the remote control device display 10 as it would appear after pressing the Dn button three times and prior to pressing the Sel button.

As FIG. 2a illustrates, at this point in time, the visual display device 14 identifies CNBC as the currently selected channel, since the new channel, C-SPAN, has not yet been selected by the user.

Figures 3, 3A:
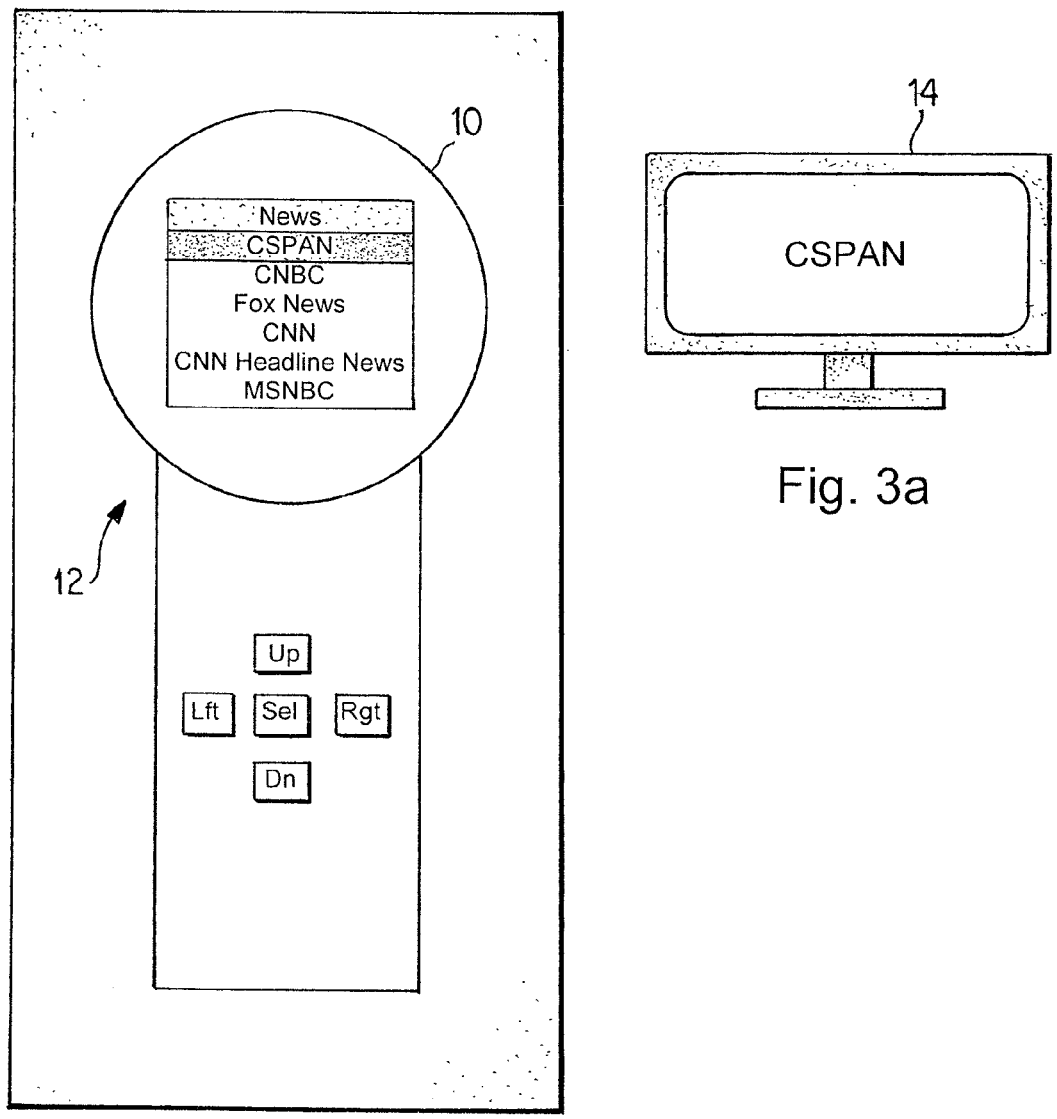
FIG. 3 is an illustration similar to FIG. 1, but in which an order of the listed icons is changed.
FIG. 3a shows the visual display device of FIG. 1a at another point in time during the channel changing procedure.

Once the cursor is aligned with the C-SPAN icon, the Sel button can then be pressed to make C-SPAN the active channel. Upon pressing the Sel button, the icons within the "News" category are re-ordered, so that the C-SPAN icon relocates to the top of the list of icons. FIG. 3 shows the display 10 of the remote control device 12 as it would appear after the Sel button has been pressed. The order of the icons is changed, as shown in FIG. 3, to reflect that C-SPAN is the current channel, with the C-SPAN icon on top. The CNBC icon moves down so that it becomes the second icon in the list, the Fox News icon moves down so that it becomes the third icon in the list, and so on. When the user presses the Sel button, moreover, the remote control device preferably also transmits a signal causing the visual display device 14 to display the legend or other identifying information associated with the newly selected channel; again, in the present case, the legend or other identifying information displayed by the device 14 at this point in time is C-SPAN.

A change of channel in another category, identified as "Sports," will now be described in connection with FIGS. 4-6 for further illustration of the manner in which channels within a particular category are selected and re-ordered. In the procedure represented by FIGS. 4-6, the category identified as "Sports" has been selected by appropriate actuation of the Lft button and/or the Rgt button, thereby making channels such as Golf Channel, NFL Network, ESPN Classic, Tennis Channel, FOX Soccer Channel, Comcast SportsNet (CSN) and so on within the "Sports" category available for selection by a user.

Figures 4, 4A:
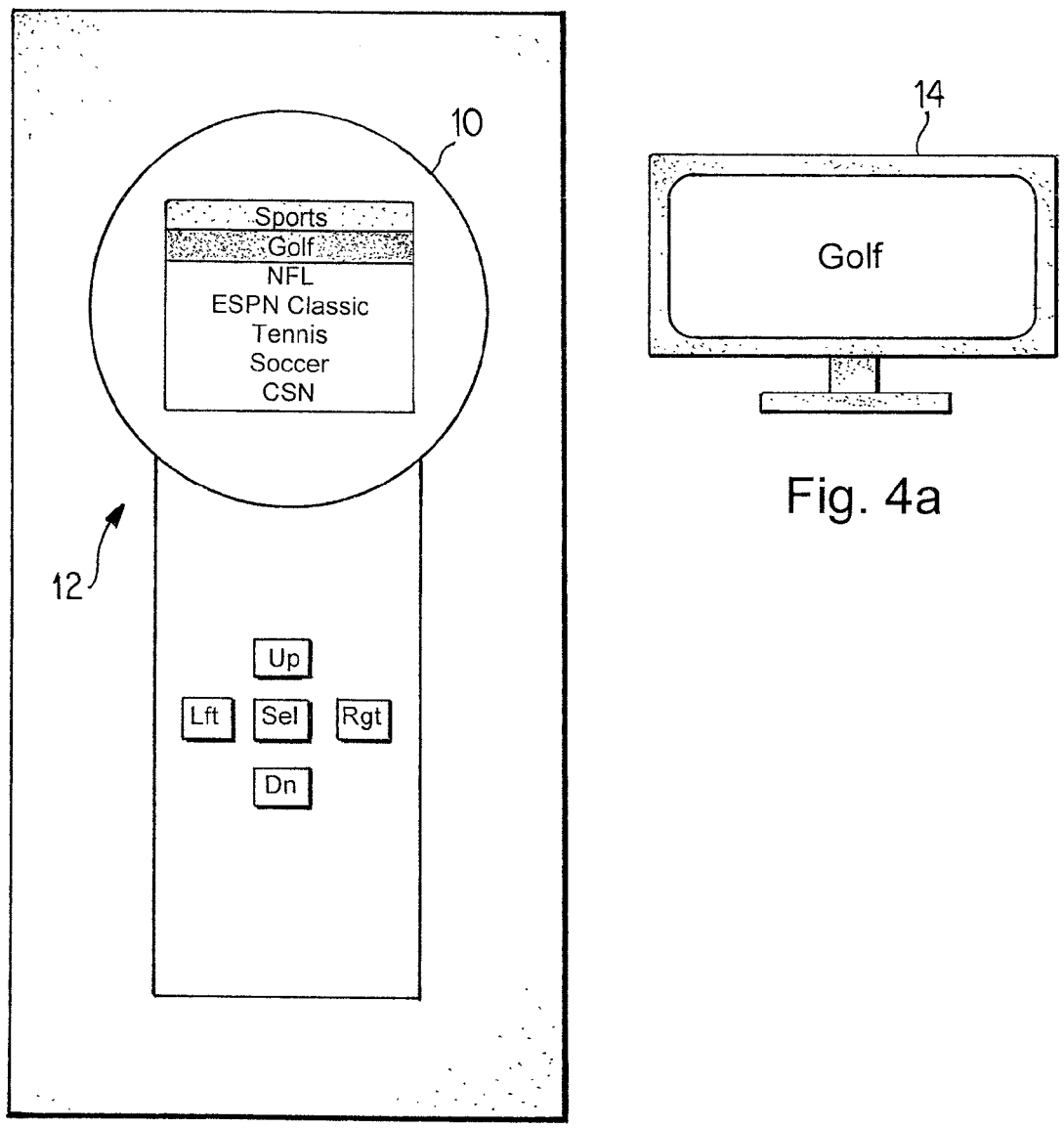
FIG. 4 is a schematic illustration of the remote control device in which the display exhibits another at least partial list of icons.
FIG. 4a is a view similar to that of FIG. 1a but relating to FIG. 4.

After using the Lft button and/or the Rgt button to select the "Sports" category, the "select" cursor will be located on the first, or topmost, icon representing the first channel in the "stack" or list, as shown in FIG. 4. This first channel is the last channel watched in the "Sports" category (Golf Channel in the illustration provided by FIG. 4). As before, to select Golf Channel, a user presses the Sel button, or to select another channel within the "Sports" category, the user operates the Up button and/or the down (Dn) button to move the cursor to the icon representing the desired channel. After moving the cursor to the icon representing the desired channel, the select (Sel) button is pressed, and the appropriate channel is made available. As before, icons in the icon directory representing channels in each category are ordered in a stack, so that an icon representing the previously selected channel in that category is now the second icon in the displayed list. Referring to FIG. 4, it is apparent that the NFL Network channel was selected immediately prior to Golf Channel, which, again, is the current channel in the "Sports" category. Similarly, the third icon in the list ("ESPN Classic" in FIG. 1) represents the channel watched immediately prior to the second channel (NFL Network) in the list, and so on.

The remote control device 12, being configured to transmit signals causing the visual display device 14 to display a legend or other identifying information associated with the currently selected channel, identifies Golf Channel as the currently selected channel at this point in time. This is shown in FIG. 4a.

Figures 5, 5A:
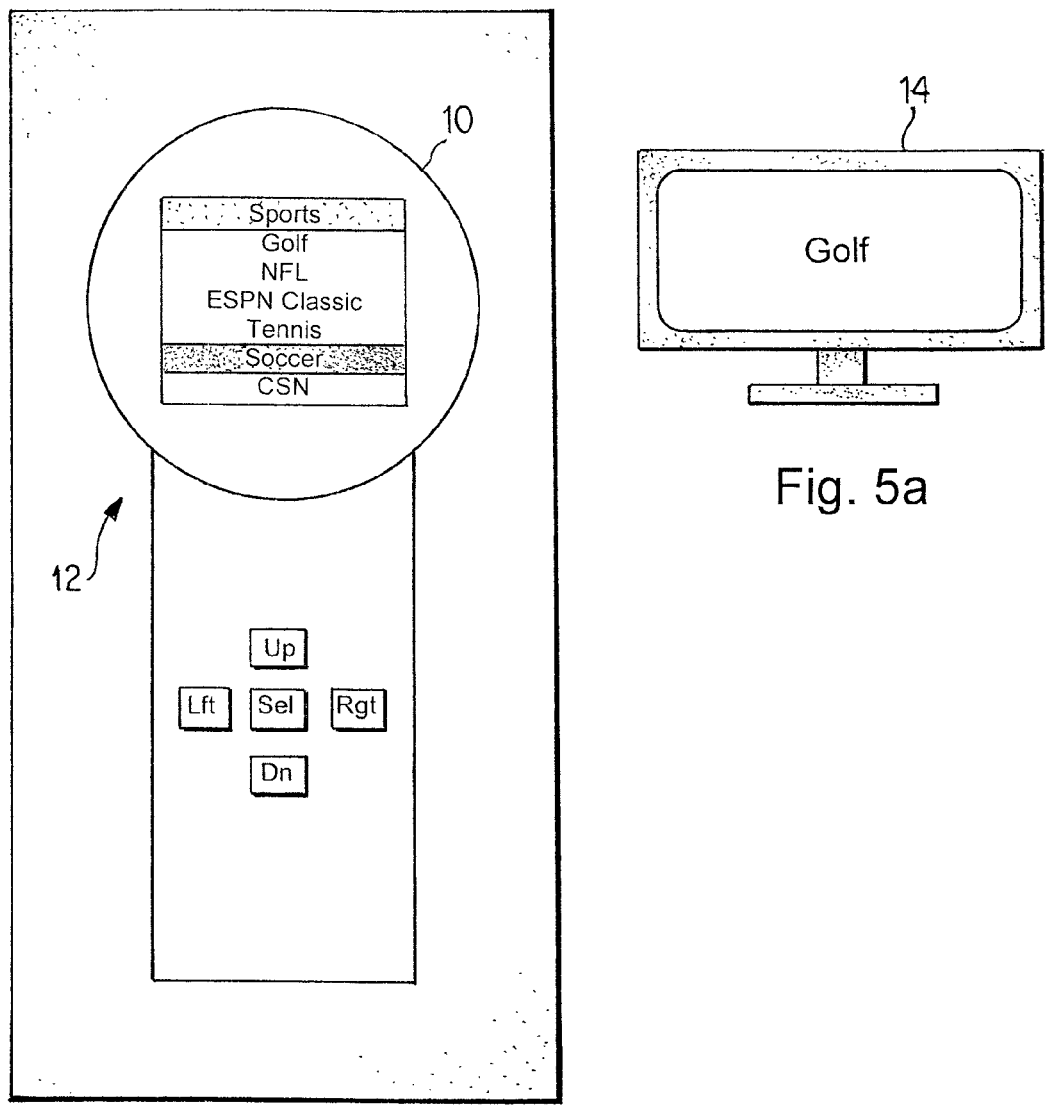
FIG. 5 is an illustration similar to FIG. 4, but in which the remote control device display exhibits a different cursor position during another channel changing procedure.
FIG. 5a shows the visual display device of FIG. 4a at one point in time during the channel changing procedure reflected in FIG. 5.

To switch from the current channel, Golf Channel, to FOX Soccer Channel, for example, a user presses the Dn button four times, moving the cursor away from the Golf icon and past the "NFL," "ESPN Classic," and "Tennis" icons, so that the cursor is aligned with the "Soccer" icon, representing FOX Soccer Channel, as shown in FIG. 5. FIG. 5 shows the display 10 as it would appear after pressing the Dn button four times as described and prior to pressing the Sel button. As FIG. 5a illustrates, at this point in time, the visual display device 14 identifies Golf Channel as the currently selected channel, since the new channel, FOX Soccer Channel, has not yet been selected by the user.

Once the cursor is aligned with the Soccer icon, the Sel button can be pressed to make FOX Soccer Channel the active channel. Upon pressing the Sel button, the icons within the "Sports" category are re-ordered, so that the Soccer icon relocates to the top of the list of icons. FIG. 6 shows the display 10 of the remote control device 12 as it would appear after the Sel button has been pressed under these circumstances. The order of the icons is changed to reflect that FOX Soccer Channel is the current channel, with the Soccer icon on top. The Golf icon moves down so that it becomes the second icon in the list, the NFL icon moves down so that it becomes the third icon in the list, and so on. When the user presses the Sel button, moreover, the remote control device also transmits a signal causing the visual display device 14 to display the legend or other identifying information associated with the newly selected channel; again, in the present case, the legend or other identifying information displayed by the device 14 at this point in time is "Soccer."

FIG. 7 shows one possible menu of channel categories and icons representing channels within each channel category. Such a menu is storable in a conventional non-volatile memory of the remote control device 12. In the menu represented, a user has identified eight distinct channel categories as favorites; FIG. 7 shows these eight categories as Sports, News, Entertainment, Kids, Movies, Music, Home/Garden, and Science/History. FIG. 7 also shows each category as having fourteen channels identified by the user as favorites. Icons representing the channels within each category, stored in the memory of the remote control device, are dynamically re-ordered upon pressing the Sel button as discussed above in connection with FIGS. 1-6a, with a currently selected icon being moved to the top of the list of icons in any particular category. As mentioned, however, the device also dynamically adjusts the order of channel categories to assure that icons representing the most recently viewed channels are the fewest inputs away from the current channel. This channel category adjustment or re-ordering feature is now described in connection with FIGS. 4 and 7-9, with the presumption that the menu stored in the device 12 is initially configured as represented in FIG. 7.

For the purposes of this example, it will be presumed that the channel category identified as "Sports" is initially selected by the user, and that the user is currently watching Golf Channel. The remote control device display 10 at this point, therefore, exhibits the partial list of icons shown in FIG. 4, with the cursor positioned at the "Golf" icon, while the visual display device 14 exhibits the legend "Golf" as shown in FIG. 4a. The menu stored in the device 12, again, is configured at this point as shown in FIG. 7. If the user wishes to change from Golf Channel, represented by the "Golf" icon, to the channel represented by the "Hip Hop" icon, for example, the user initially changes channel categories from "Sports" to "Music." This can be accomplished either by pressing the Lft button three times to move the cursor away from the "Golf" icon, past the "Science Channel" and "Food Network" icons, and to the "Pop" icon in the "Music" category, or by pressing the Rgt button five times to move the cursor away from the "Golf" icon, past the "CNBC," "Comedy Central," "Disney," and "Lifetime" icons, and to the "Pop" icon in the "Music" category. Channel selection within the "Music" category is then performed by pressing the Dn button five times to move the cursor past the "Top 40" icon, the "Country" icon, the "Classical" icon, and the "Rap" icon to the "Hip Hop" icon, and then pressing the Sel button to actually select the channel represented by the "Hip Hop" icon. The visual display device 14, after this actual channel selection, exhibits the legend "Hip Hop" as shown in FIG. 8a, while the display 10 exhibits the partial list of icons shown in FIG. 8.

Upon actuation of the Sel button, the entire channel category ("Music" in the present example), including the newly selected channel, is also repositioned in the menu so that the channel category including the last viewed channel is located directly adjacent the channel category including the newly selected channel. In the example described here, when the user changes channel categories from Sports to Music by pressing the Rgt button five times to move the cursor away from the "Golf" icon, past the "CNBC," "Comedy Central," "Disney," and "Lifetime" icons, and to the "Pop" icon in the "Music" category, and after spacing down to the "Hip Hop" icon, upon actuation of the Sel button to select the channel represented by the "Hip Hop" icon, the menu illustrated in FIG. 7 is reconfigured in the control device memory, resulting in the menu illustrated in FIG. 9. As shown in FIG. 9, the "Music" category is relocated so that Golf Channel, in the "Sports" channel category, is again accessible by pressing the Lft button only a single time, and then pressing the Sel button. CNBC, the last channel watched in the "News" category, is similarly accessible by pressing the Rgt button only a single time, and then pressing the Sel button.

A comparison of FIGS. 9 and 10 illustrates that the icon categories are dynamically reconfigured into sequences that differ depending on how the cursor is displaced. When the user changes channel categories from Sports to "Music" in a different way by pressing the Lft button three times, then spacing down to the "Hip Hop" icon and actuating the Sel button to select the channel represented by the "Hip Hop" icon, the menu illustrated in FIG. 7 is reconfigured in the control device memory to produce the menu illustrated in FIG. 10. As shown in FIG. 10, the "Music" category is relocated so that Golf Channel, in the "Sports" channel category, is again immediately accessible, this time by pressing the Rgt button only a single time and then pressing the Sel button. SCIENCE Channel, the last channel watched in the "Science/History" category, is similarly accessible by pressing the Lft button only a single time and then pressing the Sel button, while the History Channel, the second to last channel watched in the "Science/History" category, is accessible by pressing the Lft button a single time, the Dn button a single time, and the Sel button. The key principle here is that the dynamic reordering of categories and channels, based on which channels were most recently viewed, keeps the channels viewed most recently the fewest clicks away.

Electronic components of the remote control device 12 itself would include nothing beyond components already used in common, inexpensive universal TV remote control devices, arranged in an appropriate combination of a few programmable firmware chips, transistors, resistors, capacitors, diodes, a resonator, button contact points, a 1"×1.5" or similarly sized LCD display, an infrared LED, a USB connector jack for linking with a PC, a battery, and contacts. The device would be shipped with an initial programming configuration to be updated and modified prior to use by way of a PC providing Internet access.

Programming would entail setting up a menu structure based on satellite or local cable service. Such programming, related codes for satellite or cable service, and related switch box and multiple television tuner configurations would be maintained on a website. During setup, a user would need to decide how many categories are desired, and to assign specific channels to those categories. The user would select from a list of cable and satellite services, if applicable, and from a list of devices including, for example, a cable box, a satellite box, or particular television set types.

The "flashback" or "backtrack" (BAKTRACK) logic discussed above could conceivably be programmed into many types of devices, and use of "flashback" logic, which incorporates categories and items that dynamically reorganize themselves based on how recently particular items have been accessed, should not be considered limited to television remote control applications only. Conceivable applications include use of such logic in Apple iPhones or other personal digital assistant (PDA) devices (pocket PCs, cellular telephones, smart phones, other remote control devices, and so on).

Cable and satellite operators, such as Verizon, Comcast, and DirecTV, could have an interest in the technology; by programming "flashback" logic into existing remote control systems offering significantly enhanced and easier management of the large number of channels. Particular cable operators could also find the invention to produce competitive advantages in given markets.

Figure 11:
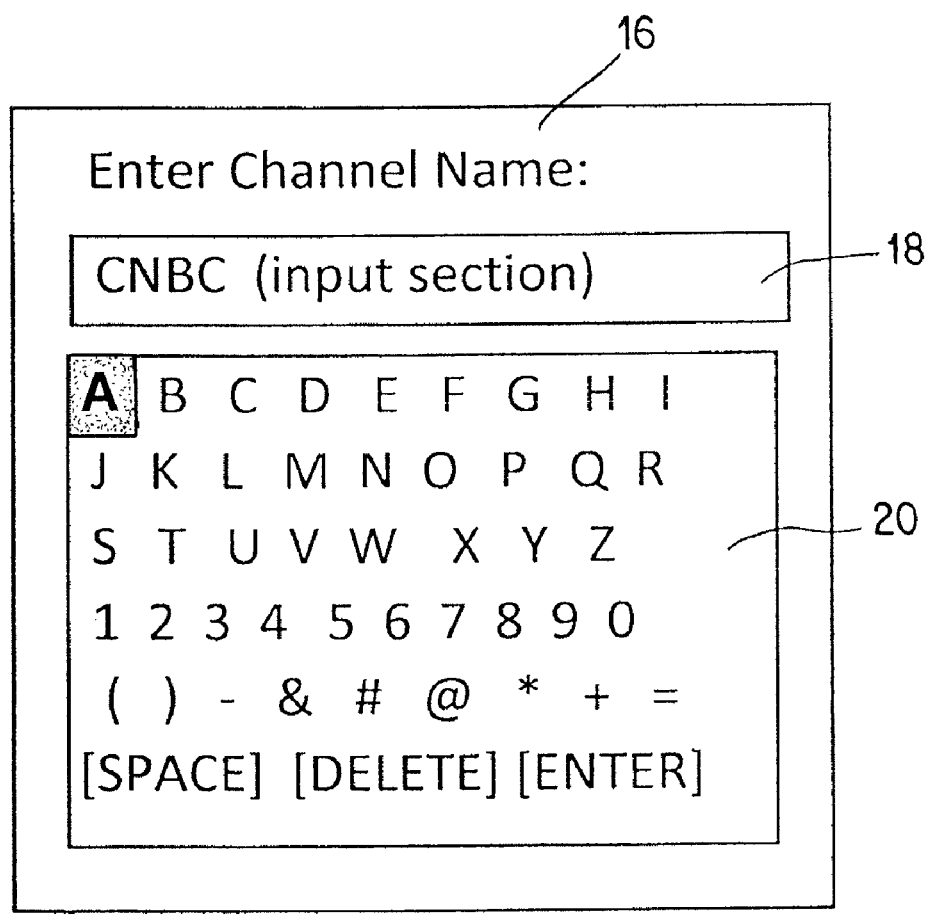
FIG. 11 is a view of the display or window of the remote control device as it appears when set to receive manual input from a user.

In its most preferred configuration, the remote control device would have the ability to accept manual input consisting of alphanumeric text and other symbols using the five primary control buttons. Such an input function could be set up by providing the device with an "input" setting. When set to receive input, the window of the remote control device display 10 could appear as illustrated in FIG. 11, in which the display contains three primary sections: (1) an input prompt section 16 at the top of the display, (2) a rectangular input section 18, just below the prompt section 16, containing the input (alphanumeric characters in the order selected), and (3) a symbol section 20, defined by an area below the input section 18, containing a symbol table of alphanumeric symbols in rows and columns from which the input characters are chosen. The cursor (reverse video) could initially rest on the upper left symbol (row 1, column 1) in the symbol table as shown in FIG. 11, and then be moved to a specific symbol with the Up, Dn, Lft, and Rgt keys or buttons. The central Sel button could be used to select the specific symbol where the cursor then rests. When selected, the symbol would be added to a string of characters in the input section. The cursor can move from the symbol table to the selected input by moving the cursor up to the input section 18 from the top row in the symbol section 20. The symbol table contains selections for spacing ("[SPACE]"), deleting a character ("[DELETE]"), and entering input into the device ("[ENTER]").

Figure 12A:
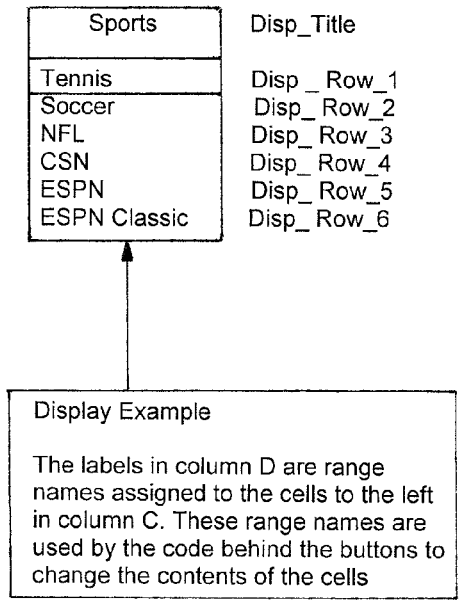
FIG. 12A illustrates an example of output provided by the remote control display and associated labels.
Figure 12B:
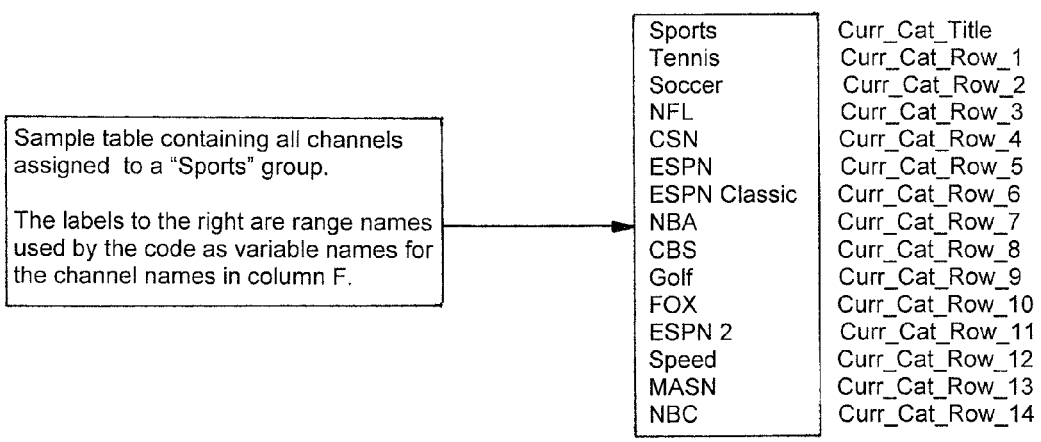
FIG. 12B illustrates a sample table, containing channels assigned to a certain channel category or group, and an adjacent column showing associated range names.

Prototype programming effective to change cell content, in a Microsoft Excel spreadsheet application, of a remote control device in the manner described above has already been completed. FIG. 12A is an example of output provided by a display 10 and an adjacent column showing corresponding labels defining range names usable by code, in the Microsoft Excel spreadsheet application, to change cell content. FIG. 12B illustrates a sample table, containing all channels assigned to a "Sports" category or group, and an adjacent column showing range names usable by code, in the Microsoft Excel spreadsheet application, as variable names for the corresponding channel names.

The remote control device can allow for wireless updating of specific channels and IR codes based on specific cable and or satellite systems being controlled and the location of the device designated by either GPS or zip code entered via a simple interface with the displayed number pad and the five buttons mentioned.

As mentioned, the device has a minimum number of additional control buttons other than the five primary buttons, Up, Dn, Lft, Rgt, and Sel, used to control channel selection. These additional control buttons include (1) an on/off button to control both the television monitor/tuner and any peripheral devices associated with the system, such as cable/satellite set-top boxes, surround sound equipment, and so on, (2) a mute button to turn sound on and off, (3) two volume control buttons, one to increase sound volume and the other to decrease sound volume, and (4) an information (Info) button to activate a display of information about programming on the current channel. This particular button preferably has a "toggle" logic, by which the successive operation of the button alternately activates the information display and deactivates that display. A "menu" button for activating a menu system used to set up and maintain the device is also preferably provided.

It is contemplated that the device will be able to interface with PC software via the USB connection mentioned previously. PC software would be used to download channel information from a website based on the particular cable/satellite system used and location information, such as a zip code. Setup options include (1) manual input using an internal menu structure, and input using the simple input method described, and (2) using PC browser-based software with a designated website connection. The USB connection mentioned, again, will be used to update firmware in the device. A wireless connection, which accesses a user account maintained via a designated website, could also be used to update the device.

Companies like Apple and Microsoft are aggressively pursuing inroads into the home entertainment market; AppleTV and Microsoft Xbox are examples of such efforts. It is expected that these companies could benefit from a device incorporating the features described. Such a device should be appealing to virtually everyone that watches television. If established as a remote control device of choice for substantial television watching, the device could serve as a platform for many kinds of extensions in the home entertainment space. Possibilities are essentially limitless once television, streaming video, other Web content, and wireless connectivity aspects are combined. The device could become an integral component of a user experience, and the core differentiator for a product distribution/marketing strategy. Once a "beachhead is established, leveraging the device as a component of a wide variety of applications and product offerings becomes a natural extension.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A process for providing output from a remote control device useable to select a desired communication channel from among multiple communication channels in a plurality of channel categories, comprising:
   selecting an icon, representing the desired communication channel, within a selected category of icons displayed by the remote control device, representing channels in a selected channel category, in place of an unselected icon;
   dynamically reconfiguring icons within the selected category of icons, based on how recently the icons were selected, as well as icon categories, so as to minimize inputs necessary to alternate from the selected icon back to the unselected icon; and
   outputting a signal from the remote control device that is receivable by a communication device in order to effect a change to said desired communication channel;
   wherein dynamically reconfiguring said icons within said selected category of icons includes changing an order of icons within the selected category of icons so that the selected icon is first in a displayed list of icons within said selected category and so that other icons within the selected category appear in the list based on how recently those other icons were selected.

2. The process of claim 1, wherein dynamically reconfiguring said icon categories includes changing an order of icon categories so that an icon category including the selected icon and an icon category including the unselected icon are directly adjacent to one another.

3. The process of claim 2, wherein the icon representing the desired communication channel is chosen by displacing a cursor displayed by the remote control device in any of four directions and then actuating a button to select the icon.

4. The process of claim 3, wherein the remote control device includes separate buttons that are respectively actuated to displace the cursor in one of said four directions.

5. The process of claim 4, wherein the icon categories are dynamically reconfigured into sequences that differ depending on how the cursor is displaced.

6. The process of claim 1, wherein the icon representing the desired communication channel is chosen by displacing a cursor displayed by the remote control device in any of four directions and then actuating a button to select the icon.

7. The process of claim 6, wherein the remote control device includes separate buttons that are respectively actuated to displace the cursor in one of said four directions.

8. The process of claim 7, wherein the icon categories are dynamically reconfigured into sequences that differ depending on how the cursor is displaced.

9. A television remote control device that performs a process for providing output useable to select a desired communication channel from among multiple communication channels in a plurality of channel categories as defined by claim 1.

10. A television remote control device that performs a process for providing output useable to select a desired communication channel from among multiple communication channels in a plurality of channel categories as defined by claim 2.

* * * * *